Figure 1:
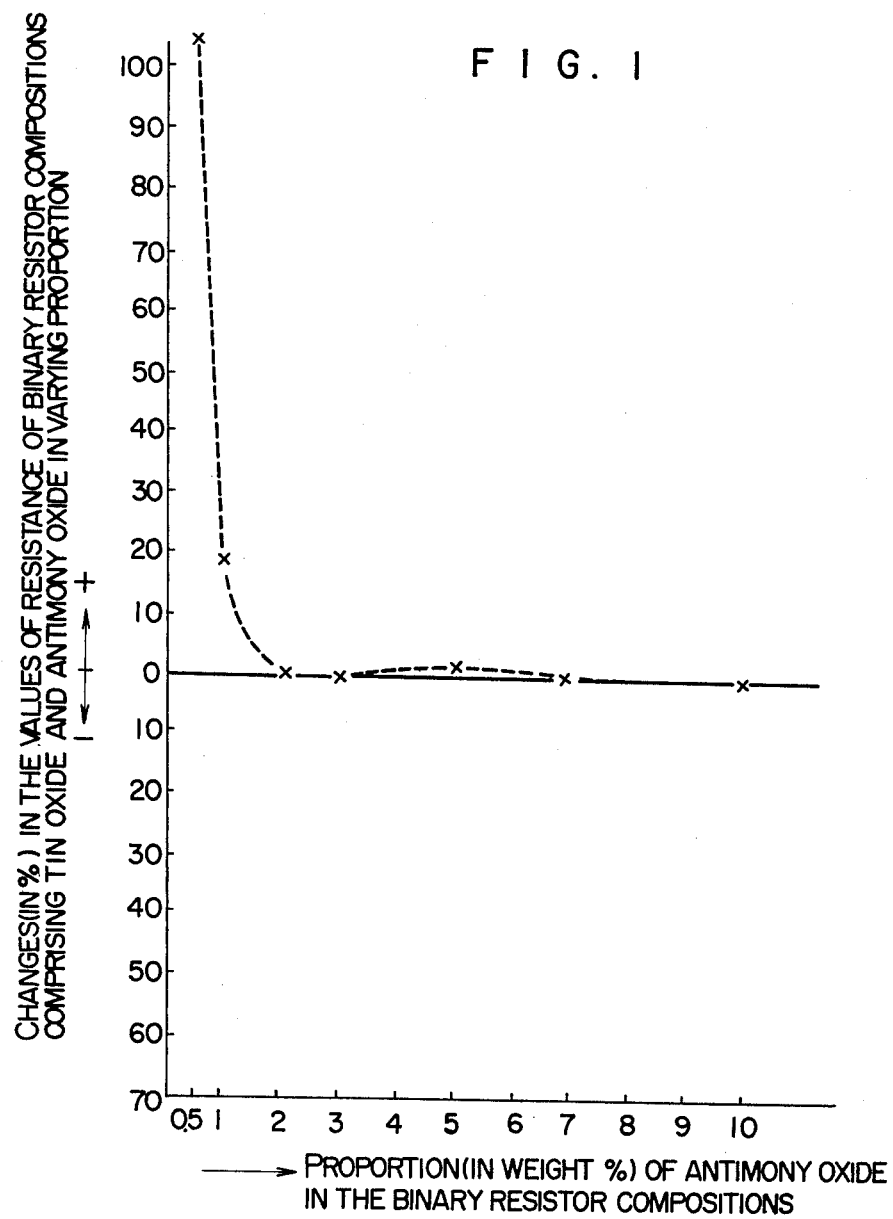

United States Patent
Kamigaito et al.

[11] 3,923,698
[45] Dec. 2, 1975

[54] RESISTORS FOR IGNITION PLUGS

[75] Inventors: Osami Kamigaito; Hideyuki Masaki; Masami Oki, all of Nagoya; Masatosi Suzuki, Kariya; Yasuo Nakamura, Nagoya, all of Japan

[73] Assignees: Nippondenso Co., Ltd.; Kabushi Kaisha Toyota Chuo Kenkyusho, both of Japan

[22] Filed: Oct. 31, 1973

[21] Appl. No.: 411,403

[30] Foreign Application Priority Data
Nov. 8, 1972 Japan.............................. 47-112363

[52] U.S. Cl. .................... 252/518; 106/46; 338/66
[51] Int. Cl.² .......................................... H01B 1/08
[58] Field of Search .............. 252/506, 518; 106/46; 338/66

[56] References Cited
UNITED STATES PATENTS
| | | | |
|---|---|---|---|
| 3,088,921 | 5/1963 | Heischman | 252/516 |
| 3,577,355 | 5/1971 | Blum | 252/512 |

Primary Examiner—Benjamin R. Padgett
Assistant Examiner—E. Suzanne Parr
Attorney, Agent, or Firm—Cushman, Darby & Cushman

[57] ABSTRACT

Resistors are made of glass and a resistance material comprising 1 to 16 % by weight aluminum oxide, 75.6 to 98 % by weight tin oxide and 0.84 to 9.9 % by weight antimony oxide. Such resistors are produced by adding low melting-point glass to the resistor components so that the latter can be made to stick together and harden into coherent solid bodies.

8 Claims, 8 Drawing Figures

RESISTORS FOR IGNITION PLUGS

This invention relates to resistors, and more particularly it is concerned with resistors for ignition plugs for internal combustion engines having resistance values in a range from 3 to 20 kΩ so that they do not disturb the reception of radio and other communication signals.

Heretofore, the use of ignition plugs of low center electrode resistance values with internal combustion engines has been popular. However, ignition plugs of this type have the disadvantages of disturbing the reception of radio and other communication signals by producing electromagnetic waves when sparks are produced. Advances made in the progress of communication facilities have in recent years given rise to a cry for the need to control production of interfering electromagnetic waves. To cope with the situation, proposals have been made to insert a resistor in the electric circuit of an ignition plug for an internal combustion engine. Several systems have been proposed for inserting a resistor, and they may be broadly grouped into two systems or the system of inserting a resistor in the interior of the ignition plug and the system of mounting one in a high voltage wire of the ignition circuit.

In order to eliminate disturbance of the reception of communication signals, it is required that a resistor should have a resistance value which is in a range from 3 to 20 kΩ both at normal temperature and when heated and its temperature is raised up to 400°C.

Since ignition plugs must be capable of resisting heat and withstanding high voltages, ignition plugs which have hitherto been favored are those of the conductively sealed type in which particles of electrically conductive materials are caused to stick together and harden into a coherent body by using low melting-point glass. In resistors for ignition plugs of the conductively glass sealed type, resistor components, such as metallic particles (copper, iron, nickel, or nickel-chrome alloys), particles of carbon and the like or particles of metallic oxides of low resistance (zinc oxide, barium oxide, trichromium dioxide, nickel oxide and the like) are added with glass particles of low melting point, such as borosilicate glass, and the mixture is heated to a temperature above the melting point of the glass so that the electrode may be sealed by adhesion force and the glass sealed body may serve as a resistor.

Some disadvantages are associated with the resistors of this type for ignition plugs produced as aforementioned. They are low in resistance value, with their resistivity values being below 0.01 kΩ-cm. Such resistors of low resistance values are not effective in preventing noise production even if they are inserted in ignition plugs because their resistance values are below 0.1 kΩ. The resistance values of the resistors may be increased if the proportion of glass is increased. However, a slight change in the proportion of glass causes a great change in the values of resistivity of the resistors as from 0.01 to 1,000 kΩ-cm to take place. Thus such resistors do not lend themselves to production on a commercial basis. Also, resistors of increased resistance values for ignition plugs which might be produced by increasing the proportion of glass in the resistors would be of little practical value because they are structurally unstable with the resistor components being scattered in the glass.

This invention has as its object the provision of resistors for ignition plugs made of novel resistor compositions so that the resistors have high resistance values ranging from 3 to 20 kΩ and are highly effective in preventing noise production.

According to the invention, there are provided resistors for ignition plugs comprising as resistance material 1 to 16% by weight aluminum oxide, 75.6 to 98% by weight of tin oxide and 0.84 to 9.9% by weight antimony oxide, such resistor components being added with low melting-point glass so that the former can be made to stick together and harden into coherent solid bodies.

Figure 2:
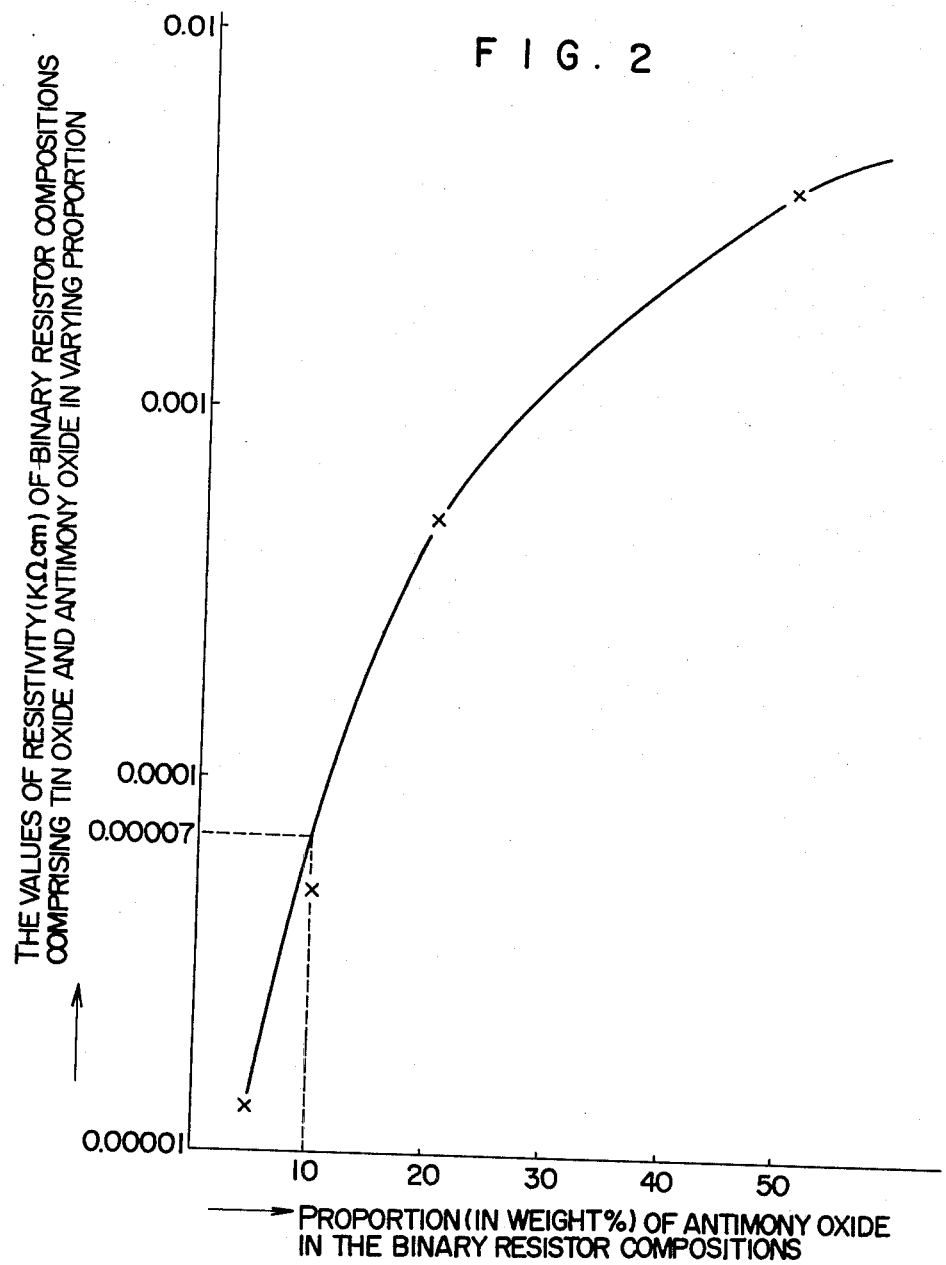
Figure 3:
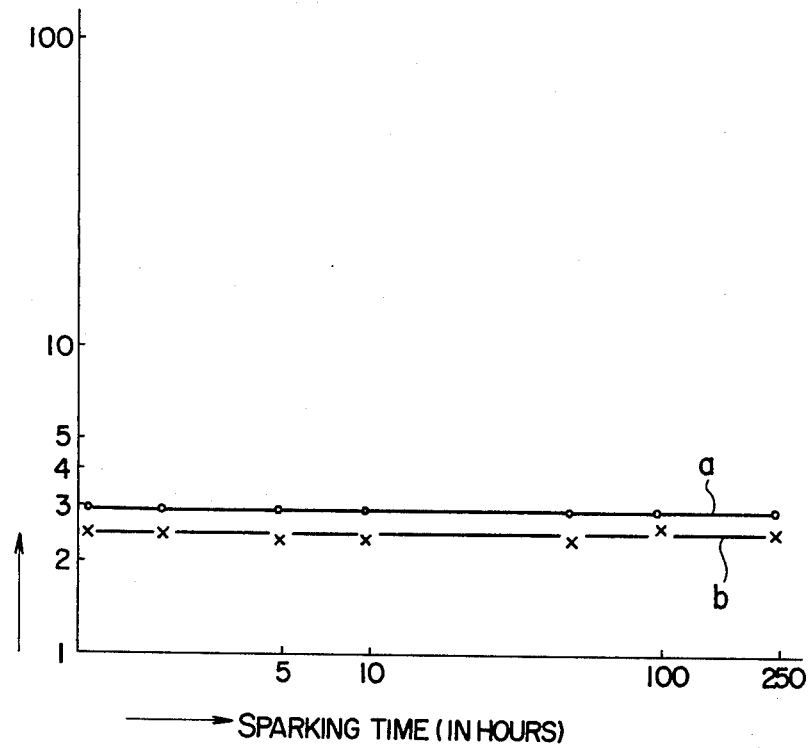
Figure 4:
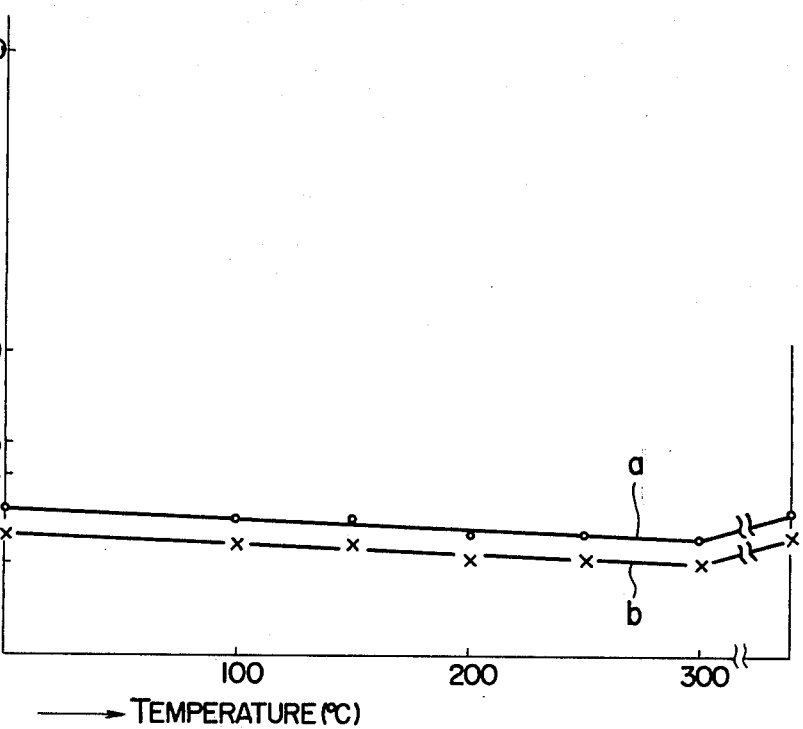
Figure 5:
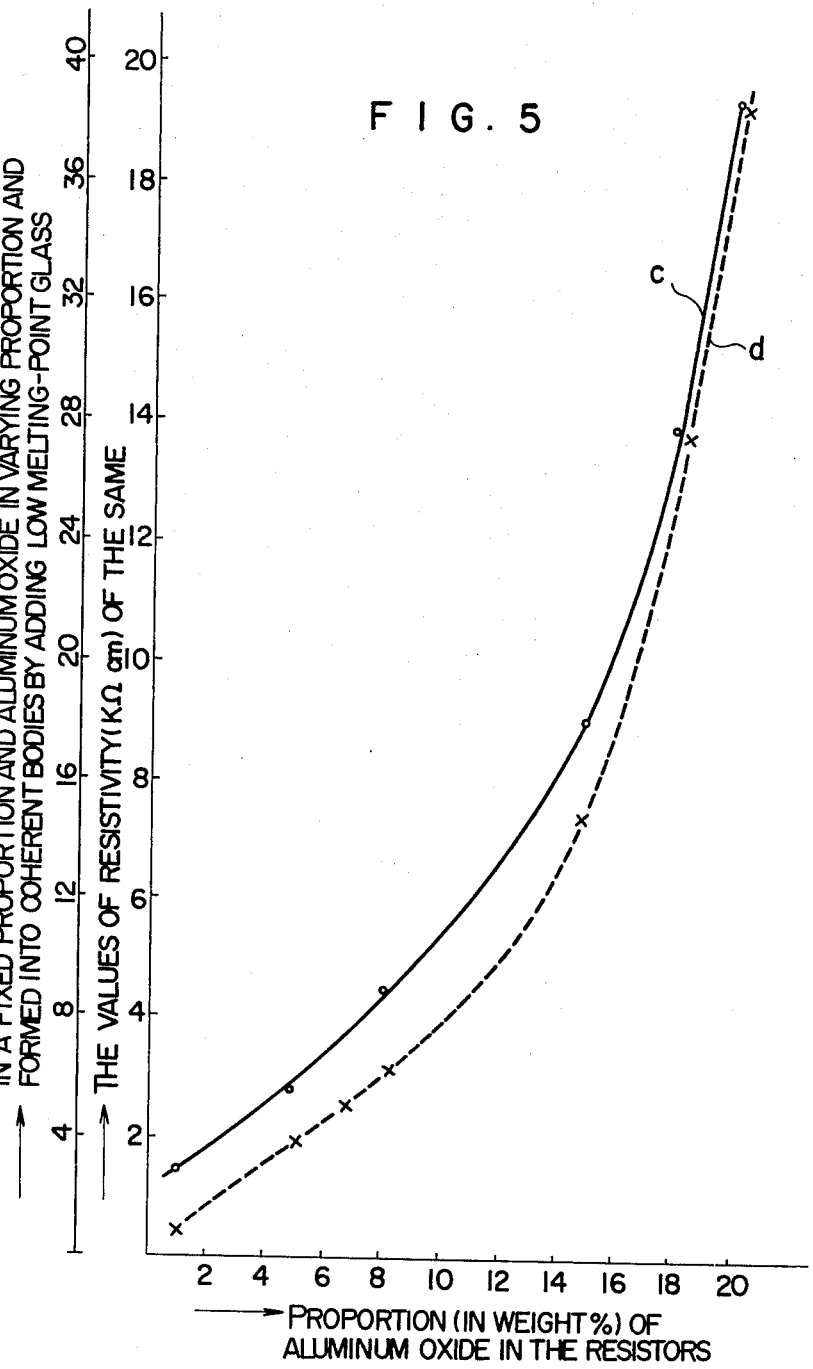
Figure 6:
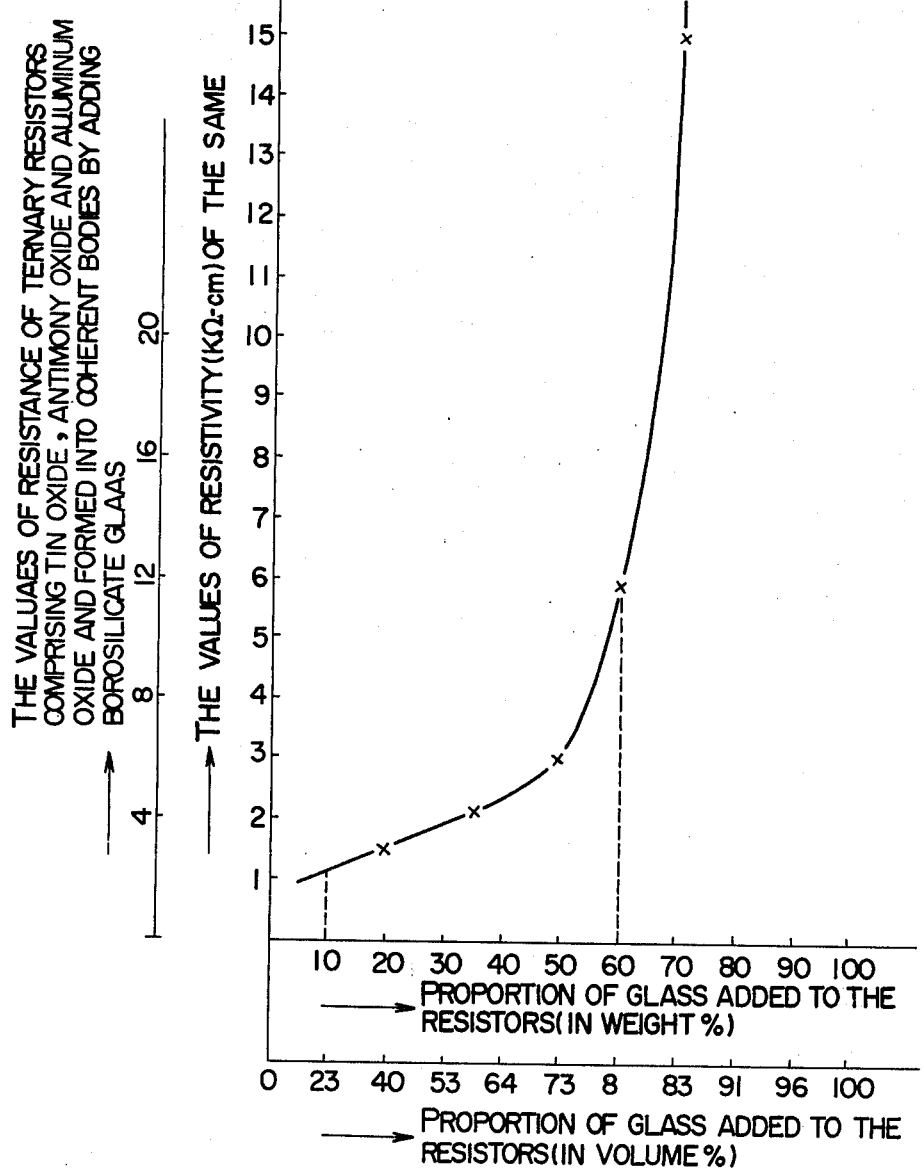
Figure 7:
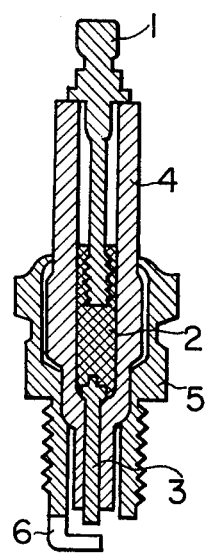
Figure 8:
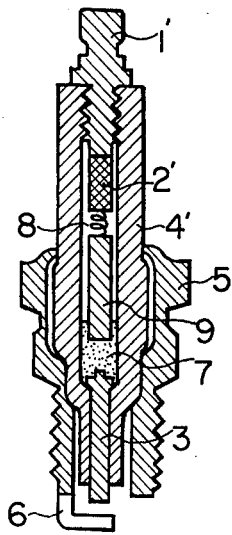

FIG. 1 to FIG. 6 are diagrams illustrating the results of experiments,

FIG. 1 showing changes (in percent) in resistance value in relation to the proportion of antimony oxide before and after sparking of binary resistor compositions comprising tin oxide and antimony oxide in varying proportion and added with glass to cause them to stick together and harden and thus make the resistor;

FIG. 2 showing the resistivity values of binary resistor compositions comprising tin oxide and antimony oxide in relation to the proportions of antimony oxide in such resistor compositions;

FIG. 3 showing the resistivity values of the resistors according to the invention made of ternary resistor compositions in relation to sparking time;

FIG. 4 showing the resistivity values of the resistors shown in FIG. 3;

FIG. 5 showing the resistivity values of the resistors according to the invention in relation to the proportion of aluminum oxide in the resistors; and FIG. 6 showing the resistance values and resistivity values of the resistors in relation to the proportion of glass added in the resistors;

FIG. 7 is a sectional front view of an ignition plug in which one of the resistors according to the invention is sealed; and FIG. 8 is a sectional front view of an ignition plug in which another resistor according to the invention is arranged in the form of a rod.

The resistors for ignition plugs according to the invention comprise aluminum oxide, tin oxide and antimony oxide which are made to stick together by adding low melting-point glass thereto. In the invention, aluminum trioxide ($Al_2O_3$) is used as aluminum oxide, tin monoxide ($SnO$) or tin dioxide ($SnO_2$) as tin oxide and antimony trioxide ($Sb_2O_3$) or antimony tetroxide ($Sb_2O_4$) as antimony oxide. Borosilicate glass is used as low melting-point glass.

Production of such resistors will be described by way of example with reference to FIG. 7 and FIG. 8. 99% by weight tin dioxide and 1% by weight antimony trioxide are mixed and made to react with each other in an alumina crucible by heating at 1,100°C for 5 hours. Then the mixture is cooled to normal temperature, and 92% by weight of the mixture and 8% by weight aluminum trioxide are mixed well and made to react with each other at 1,100°C for 5 hours. The resistor composition in particulate form is mixed with low melting-point glass consisting largely of a borosilicate in powder form and added with 1% by weight of an organic binder. The resistor composition and the glass are in equal proportion. The mixture is granulated and filled in a predetermined amount in an axial bore formed in an insulator 4 above a center electrode 3 as shown in FIG. 7. Then an inner shaft 1 is inserted in the axial bore from above. The insulator 4 is heated at 850°C for 30 minutes, and then pressure is applied to the inner shaft 1 so that the granulated mixture may be sealed in the axial bore by heat and pressure. After the mixture is fixed and cooled, it serves as a resistor 2. 5 is a housing, and 6 a grounded electrode.

The resistor 2 produced as aforementioned and interposed between the center electrode 3 and inner shaft 1 performs not only the function of preventing disturbance of the reception of communication signals but also the functions of securing the center electrode and inner shaft to the insulator 4 in airtight relationship. Such resistor has been found to have a resistance value of 9 kΩ at normal temperature and 8.1 kΩ when heated to 400°C. Tests on airtightness show that the ignition plugs having the resistor 2 is free from leak even under a pressure of 30 kg/cm$^2$. The ignition plug having the resistor 2 was attached to a motor vehicle engine and tested. The results show that the provision of the resistor 2 is effective in minimizing noise production which might otherwise occur when conventional ignition plug having no resistor is employed.

In FIG. 8, another resistor according to the invention is arranged in the form of a rod-shaped solid in the axial bore of the insulator. The center electrode 3 inserted in the lower end portion of the axial bore of the insulator 4 is sealed by a conventional high conductive material 7. A metallic conductor is secured to the upper portion of the material 7, and a spring 8 is mounted on the metallic conductor. The resistor 2' according to the invention is interposed between the spring 8 and inner shaft 1'. The inner shaft 1' is threaded into the axial bore of the insulator 4 to hold the resistor 2' in place. Thus the resistor 2' arranged as aforementioned need not perform the function of securing the electrodes and the inner shaft 1 to the insulator 4 as is the case with the resistor 2 shown in FIG. 7.

The aforementioned resistors comprise 50% of a ternary resistor composition comprising 91.08% tin dioxide, 0.92% antimony trioxide and 8% aluminum trioxide; and 50% of glass.

As aforementioned, the resistors according to the invention comprise as resistance material 1 to 16% by weight aluminum oxide, 75.6 to 98% by weight tin oxide and 0.84 to 9.9% by weight antimony oxide, such resistor components being sintered (made to stick together and harden) by adding low melting-point glass thereto. The reasons why the aforementioned range of components is adapted in the invention will now be described.

First of all, in order that any ignition plug may be stable in performance or changes in resistance shown by the resistor in the ignition plug may be minimized in spite of repeated sparking, it is required that tin oxide and antimony oxide should be in a predetermined proportion to each other. Stated differently, when tin oxide is 90 to 99% by weight, antimony oxide should be 10 to 1% by weight. It has been found that, when antimony oxide is below 1%, the resistor is unstable in performance. When it is above 1%, the resistor is highly stable in performance. However, when it is above 10%, air bubbles are formed and tend to invade the glass phase when the resistor components are made to stick together and harden by adding glass to them thereby producing a resistor unfit for practical use.

When the resistors are composed of these two components only or they are of the binary resistor system, their resistivity values are rather low, being in a range from 10$^{-5}$ to 10$^{-2}$ kΩ-cm. Thus the resistors produced are not satisfactory for specifications. This makes it necessary to add aluminum oxide as a third resistor component to the binary resistor compositions. According to the invention, aluminum oxide is added in an amount such that, when the mixture of tin oxide and antimony oxide is 84 to 99% by weight, aluminum oxide is 16 to 1% by weight. It has been found that, when aluminum oxide is below 1%, it is not possible to produce a resistor having a resistance value of over 3 kΩ when used with an ignition plug of a size fit for practical use, and that, when aluminum oxide is about 16%, it is not possible to produce a resistor having a resistance value below 20 kΩ. It will be appreciated that the resistors according to the invention comprise as resistance material 1 to 16% by weight aluminum oxide, 75.6 to 98% by weight tin oxide and 0.84 to 9.9% by weight antimony oxide for the aforementioned reasons.

In the embodiment described previously, the ratio of the low melting-point glass to the ternary resistor composition was 50 : 50. It is to be understood that the invention is not limited to this proportion and that the proportion may be varied. For example, when the resistor composition is 40%, the glass is 60% and when the former is 90%, the latter is 10%. It has been found that, when the glass is over 60%, it invades particles of the resistor composition and increases the resistance value of the resistor. Also, a slight change in the amount of glass in proportion to that of a resistor composition results in a great change in the resistance value of the resistor, thereby making it difficult to produce resistors of desired resistance values (See FIG. 6). The glass is preferably over 10% so as to be able to satisfactorily cause particles of the resistor composition to stick together. When the resistor is sealed in the ignition plug as shown in FIG. 7, it is desirable that the glass should be over 20% in order that the ignition plug may be kept airtight.

Any resistor according to the invention can be used with an ignition plug by arranging it in one of the three different positions: inserted in the ignition plug and sealed in between the center electrode and inner shaft; inserted in the ignition plug in the form of a solid body; and mounted in a high voltage wire of the ignition circuit outside the ignition plug.

When a resistor is inserted in an ignition plug, the resistor 2 is sealed in, as described with reference to FIG. 7, between the center electrode 3 and the inner shaft 1 by adhesion force so that they are connected together. The resistor thus performs not only the function of preventing disturbance of the reception of communication signals but also the functions of passing a current between the inner shaft 1 and center electrode 3 and securing them to the insulator 4 in airtight relationship. When a resistor is inserted in the form of a solid body in an ignition plug, the resistor is interposed between the spring 8 and the inner shaft 1' as described with reference to FIG. 8. The resistor thus need not perform the function of airtight sealing.

As aforementioned, the present invention provides resistors comprising three resistor components or aluminum oxide, tin oxide and antimony oxide and produced by adding low melting-point glass to the resistor components to that the latter can be made to stick together and harden into coherent solid bodies. In producing such resistors, tin oxide and antimony oxide are first mixed together and heated to elevated temperature to cause them to react with each other. Aluminum oxide is then added to the mixture and heated to elevated temperature again so that they may react with each other and may be shaped into minuscule particulate form. Borosilicate glass or other low melting-point glass is added to the ternary resistor composition in minuscule particulate form, and then polyvinyl or other binder is added to the mixture. The mixture is thoroughly mixed so that it may be rendered homogeneous.

The mixture is filled in an ignition plug or mold and heated to elevated temperature to soften the glass, and then cooled to provide a coherent solid body which is used as a resistor. When the mixture is filled in the ignition plug, it is filled between the center electrode 3 and inner shaft 1 as shown in FIG. 7 as is the case with a conventional sealed resistor. Then pressure is applied to the inner shaft 1 so as to bond the resistor to the center electrode and inner shaft by adhesion force, thereby producing an ignition plug including the resistor interposed between the inner shaft 1 and center electrode 3 as shown in FIG. 7. The mixture of a resistor composition and glass filled in a cylindrical mold or other mold is subjected to successive heating and cooling. Thus a rod-shaped resistor of columnar or other shape is produced. This resistor is inserted between the conductor 9 electrically connected to the center electrode 3' and inner shaft 1' as indicated at 2' in FIG. 8.

Experiments were carried out on the proportion of resistor components to one another in the resistors and the proportion of resistor components to glass in the resistors. The results of the experiments will be described hereinafter. In the experiments, the tin oxide, antimony oxide and aluminum oxide used were in the form of $SnO_2$, $Sb_2O_3$ and $Al_2O_3$ respectively, and the low melting-point glass used was borosilicate glass. As described in each example, each resistor was produced by mixing the resistor components with the aforementioned glass so that the resistor components may be made to stick together and harden by the action of the glass.

EXAMPLE 1

FIG. 1 shows the results of experiments conducted on the stability of resistor compositions of the binary system comprising tin oxide and antimony oxide. Binary resistor compositions comprising tin oxide and antimony oxide in varying proportion were sintered by using low melting-point glass to provide binary resistors of rod shape. The binary resistors were each inserted in the form of a solid body in an ignition plug and tested by the method of testing the life of loaded resistors of JIS D5102.

In FIG. 1, there are shown the results of tests carried out to find out changes (in percent) in the values of resistance of the aforementioned binary resistors before sparking and after sparking for 250 hours. The changes in the values of resistance (in percent) are plotted as the ordinates against the proportion of antimony oxide in the binary resistors comprising tin oxide and antimony oxide as the abscissae.

It will be seen in FIG. 1 that, when antimony oxide was below 1%, the changes in the values of resistance before and after sparking were very great, so that such resistors would be unfit for practical use. On the other hand, it will be evident that, when antimony oxide was above 1%, the changes were very small, and that, particularly when antimony oxide was over 2%, there was almost no change in the values of resistance and thus the resistors proved to be highly stable in performance. However, it should be noted that, when antimony oxide exceeded 10%, an increasingly large proportion of the resistor components melted into the glass and the air bubbles formed in the glass tended to remain therein. Thus the glass was brought to a foaming state, thereby rendering the resistors unfit for practical use.

FIG. 2 shows the values of resistivity of binary resistor compositions produced by causing tin oxide to react with antimony oxide. The values of resistivity ($k\Omega$-cm) are plotted as the ordinates against the proportion of antimony oxide as the abscissae in FIG. 2 in which the ordinates are in a logarithmic scale and the abscissae are in a uniform scale. It will be seen in FIG. 2 that, when the proportion of antimony oxide in the resistor compositions was below 10%, the values of resistivity of the resistors made of binary resistor compositions comprising tin oxide and antimony oxide were low or below 0.00007 $k\Omega$.

It has been ascertained that, by adding a third resistor component or aluminum oxide to the aforementioned binary resistor compositions comprising tin oxide and antimony oxide, it is possible to increase the values of resistivity $10^3$ to $10^5$ times. The stability of ternary resistor compositions comprising aluminum oxide added to the binary resistor compositions comprising tin oxide and antimony oxide will be described with reference to FIG. 3 and FIG. 4.

FIG. 3 shows the results of tests carried out on two types of resistors produced by mixing the aforementioned ternary resistor compositions comprising tin oxide, antimony oxide and aluminum oxide with borosilicate glass in equal proportion by the method of testing the life of loaded motor vehicle ignition plugs having resistors of JIS D5102. The method consists in determining the values of resistivity ($k\Omega$-cm) of the resistors after causing the same to spark for a predetermined time interval. In FIG. 3, the values of resistivity are plotted as the ordinates against time in hours in which speaking was effected as the abscissae. In the figure, a line $a$ represents the value of resistivity of one type of resistors made of a ternary resistor composition comprising 94% by weight tin oxide, 1% by weight antimony oxide and 5% by weight aluminum oxide, and a line $b$ represents the value of resistivity of the other type of resistors made of a ternary resistor composition comprising 83.7% by weight tin oxide, 9.3% by weight antimony oxide and 7% by weight aluminum oxide. Both the ordinates and abscissae are in a logarithmic scale. As can be clearly seen in FIG. 3, the values of resistivity of the two types of resistors show no change in spite of prolonged sparking, indicating that they are superb resistors.

FIG. 4 shows the result of tests carried out on the aforementioned two types of resistors made of the ternary resistor compositions by the method of heating motor vehicle ignition plugs having resistors of JIS D5102. In the figure, the values of resistivity ($k\Omega$-cm) are plotted as the ordinates against the temperature (C) of the resistors at the abscissae, and lines $a$ and $b$ represent the values for the resistors of the same compositions as described with reference to the lines $a$ and $b$ in FIG. 3. The R in the figure indicates that the resistors are cooled to normal temperature after being heated to determine the values of resistivity. In the FIGURE, the ordinates are in a logarithmic scale and the abscissae are in a uniform scale.

It will be seen in FIG. 4 that the resistors tested show little change in the values of resistivity even when heated to elevated temperature. It is thus evident that the resistors made of ternary resistor compositions for ignition plugs according to the invention meet the requirement of JIS D5102 that the values of resistance should be within ±30% of the rated resistance value. The resistors used for the tests shown in FIG. 3 and FIG. 4 were of columnar shape and had the same size.

EXAMPLE 2

The values of resistance and resistivity of resistors made of ternary resistor compositions comprising aluminum oxide as a third component will now be described with reference to FIG. 5 in which the values of resistance (k$\Omega$) and the corresponding values of resistivity (k$\Omega$-cm) of the resistors are plotted as the ordinates against the proportion of aluminum oxide in the resistor compositions as the abscissae.

In FIG. 5, lines c and d are followed by resistors comprising tin oxide and antimony oxide in varying proportion as presently to be described, with each line representing the values of resistance and resistivity of resistors made of ternary resistor compositions comprising the aforementioned two components in a predetermined proportion and a third component or aluminum oxide in varying proportion and made to stick together by adding low melting-point glass thereto. That is, the line c represents the values of resistance (and resistivity) of resistors for ignition plugs made of a binary resistor composition comprising 99% tin oxide and 1% antimony oxide added with aluminum oxide in varying proportion and prepared by mixing 50% of each of such ternary resistor compositions with 50% of low melting-point glass. The line d represents the values of resistance of resistors for ignition plugs made of a binary resistor composition comprising 90% tin oxide and 10% antimony oxide added with aluminum oxide in varying proportion and prepared by mixing 50% of each of such ternary compositions with 50% of low melting-point glass. All the resistors used in this series of tests were of rod shape and had a length of 2.2 millimeters and a diameter of 3 millimeters.

As can be seen in FIG. 5, the values of resistance increased proportionally as the proportion of aluminum oxide in the resistor compositions increased, and that this tendency was not affected by the differences in proportion between tin oxide and antimony oxide in the resistor compositions. The higher the proportion of tin oxide in the resistor compositions, the higher were the values of resistance of the resistors. As aforementioned, the line c in FIG. 5 represents the values of resistance of resistors comprising a binary resistor composition of 99% tin oxide and 1% antimony oxide and a third component or aluminum oxide added to the binary resistor composition in varying proportion. In this binary resistor composition, tin oxide exits in its maximum proportion. It will be seen that the values of resistance of the resistors were over 3 k$\Omega$ when the proportion of aluminum oxide added to the binary resistor composition was over 1%. On the other hand, the line d in FIG. 5 represents the values of resistance of resistors comprising a binary resistor composition in which tin oxide is in its minimum proportion and a third component of aluminum oxide is added to the binary resistor composition in varying proportion. It will be seen that the resistors had values of resistance of over 3 k$\Omega$ when the proportion of aluminum oxide was over about 4%. This indicates that, if it is desired to produce resistors of a resistance value of below 20 k$\Omega$, one has only to reduce the proportion of aluminum oxide below 16% in the resistor compositions of lines c and d.

It will be evident that it is possible to produce resistors having resistance values in a range from 3 to 20 k$\Omega$ if the proportion of aluminum oxide is adjusted to 1 to 16%. The values of resistance of the resistors according to the invention can be slightly varied by varying the ratio of the amount of a resistor composition to that of low melting-point glass added to the resistor composition as presently to be described with reference to FIG. 6.

EXAMPLE 3

FIG. 6 indicates that the values of resistance of resistors undergo a change when the ratio of low melting-point glass to a resistor composition is varied. In FIG. 6, the values of resistivity (k$\Omega$-cm) are plotted as the ordinates against the proportion of glass added to the resistor composition as the abscissae. The resistor composition used in this series of tests was made up of 69.3% tin oxide, 4.7% antimony oxide and 6% aluminum oxide. Such ternary resistor composition and borosilicate glass were mixed with each other in varying proportion and heated to about 850°C to produce rod-shaped resistors. The resistors produced were tested for their resistance (k$\Omega$) and resistivity (k$\Omega$-cm). It will be seen that, when the proportion of glass exceeded 60%, the values of resistivity greatly increased, and that no large change was shown when the proportion of glass was below this level.

As aforementioned, the resistors for ignition plugs according to the invention are produced by sintering resistor compositions comprising 1 to 16% by weight aluminum oxide, 75.6 to 98% by weight tin oxide and 0.84 to 9.9% by weight antimony oxide by adding low melting-point glass to the resistor components. The resistors provided by the invention have resistance values ranging from 3 to 20 k$\Omega$ which are necessary for preventing noise production. Particularly noteworthy is the fact that the invention permits the values of resistivity of binary resistor compositions comprising tin oxide and antimony oxide to be greatly increased from below 10$\Omega$-cm to 100 – 10,000 $\Omega$-cm by adding a small proportion of aluminum oxide as a third component to the binary resistor compositions. Thus the resistance values of the resistors according to the invention can be increased without requiring to take the trouble to increase the proportion of glass. This offers added advantages in that the resistors show little variation in resistance value and their structural stability is high and that the values of resistivity of the resistors can be varied by adjusting the proportion of the aluminum oxide added to the binary resistor compositions to a suitable level. The resistors are low in cost because the aluminum oxide used as the third component of the resistor is low in cost.

What we claim is:

1. A resistor consisting essentially of 40 to 90% by weight of resistance material and 10 to 60% by weight of low melting glass, the resistance material comprising 1 to 16% by weight of aluminum oxide, 75.6 to 98% by weight of tin oxide and 0.84 to 9.9% by weight of antimony oxide, the components of said resistance material being adhered together and hardened into coherent solid bodies by said low melting glass.

2. A resistor according to claim 1, wherein the glass is a borosilicate glass.

3. A resistor according to claim 1, wherein the glass is 20 to 60% by weight of the total of glass and resistance material.

4. A resistor according to claim 1, wherein the antimony oxide is 1 to 10% by weight of the total of tin oxide and antimony oxide.

5. A resistor according to claim 1 wherein said resistor has a resistance of 3 to 20 kiloohms.

6. A resistor according to claim 1 wherein the antimony oxide is antimony trioxide or antimony tetroxide.

7. A resistor according to claim 6 wherein the antimony oxide is antimony trioxide.

8. A resistor according to claim 6 wherein the antimony oxide is antimony tetroxide.

* * * * *

UNITED STATES PATENT OFFICE
CERTIFICATE OF CORRECTION

Patent No. 3,923,698      Dated  December 2, 1975

Inventor(s) Osami Kamigaito et al

It is certified that error appears in the above-identified patent and that said Letters Patent are hereby corrected as shown below:

In Item [73], change "Kabushi" to read --Kabushiki--.

Signed and Sealed this

Sixth Day of July 1976

[SEAL]

Attest:

RUTH C. MASON
*Attesting Officer*

C. MARSHALL DANN
*Commissioner of Patents and Trademarks*